March 9, 1948. W. DE YOUNG ET AL 2,437,245
ABRADING MACHINE
Filed June 7, 1945 7 Sheets-Sheet 1

INVENTORS
William DeYoung
BY Eric C. Weathered
Ralph L Chappell
ATTORNEY

March 9, 1948.  W. DE YOUNG ET AL  2,437,245
ABRADING MACHINE
Filed June 7, 1945  7 Sheets-Sheet 2

INVENTORS
William DeYoung
Eric C. Weathered
BY
Ralph L. Chappell
ATTORNEY

INVENTORS
William DeYoung
Eric C. Weathered
BY
Ralph L. Chappell
ATTORNEY

INVENTORS
William DeYoung
Eric C. Weathered
BY Ralph L Chappell
ATTORNEY

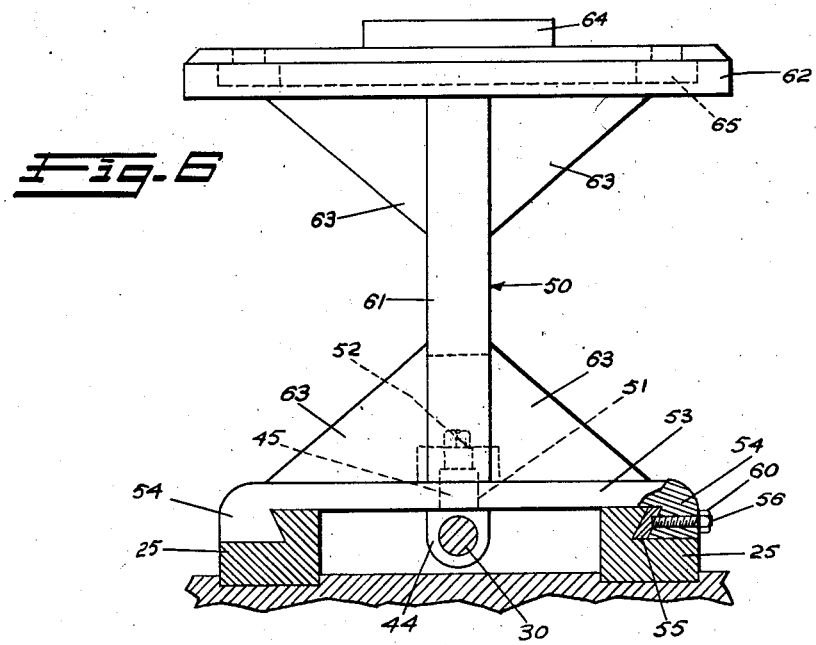
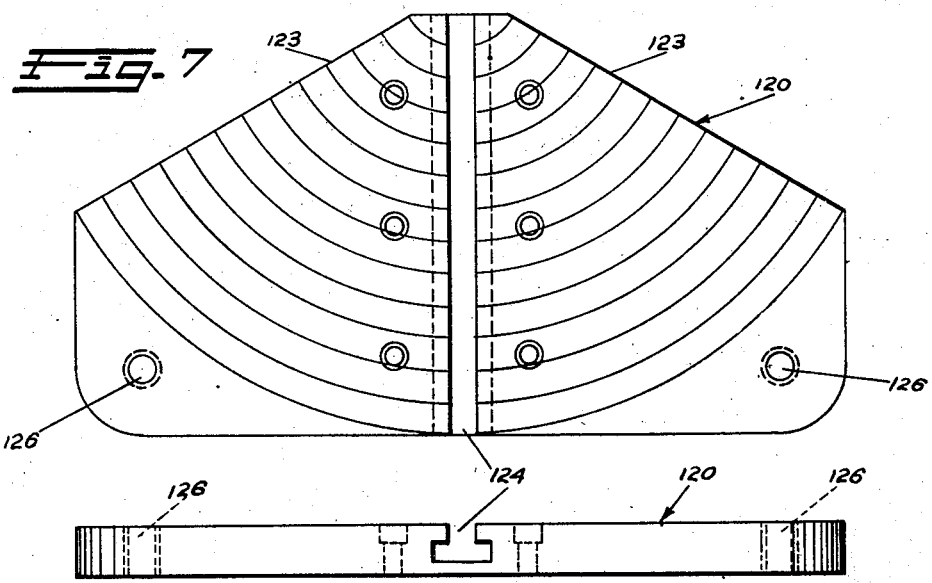
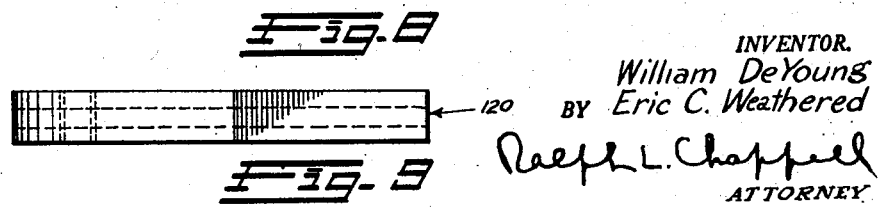
INVENTOR.
William DeYoung
BY Eric C. Weathered
Ralph L. Chappell
ATTORNEY INVENTOR.
William DeYoung
BY Eric C. Weathered

ATTORNEY

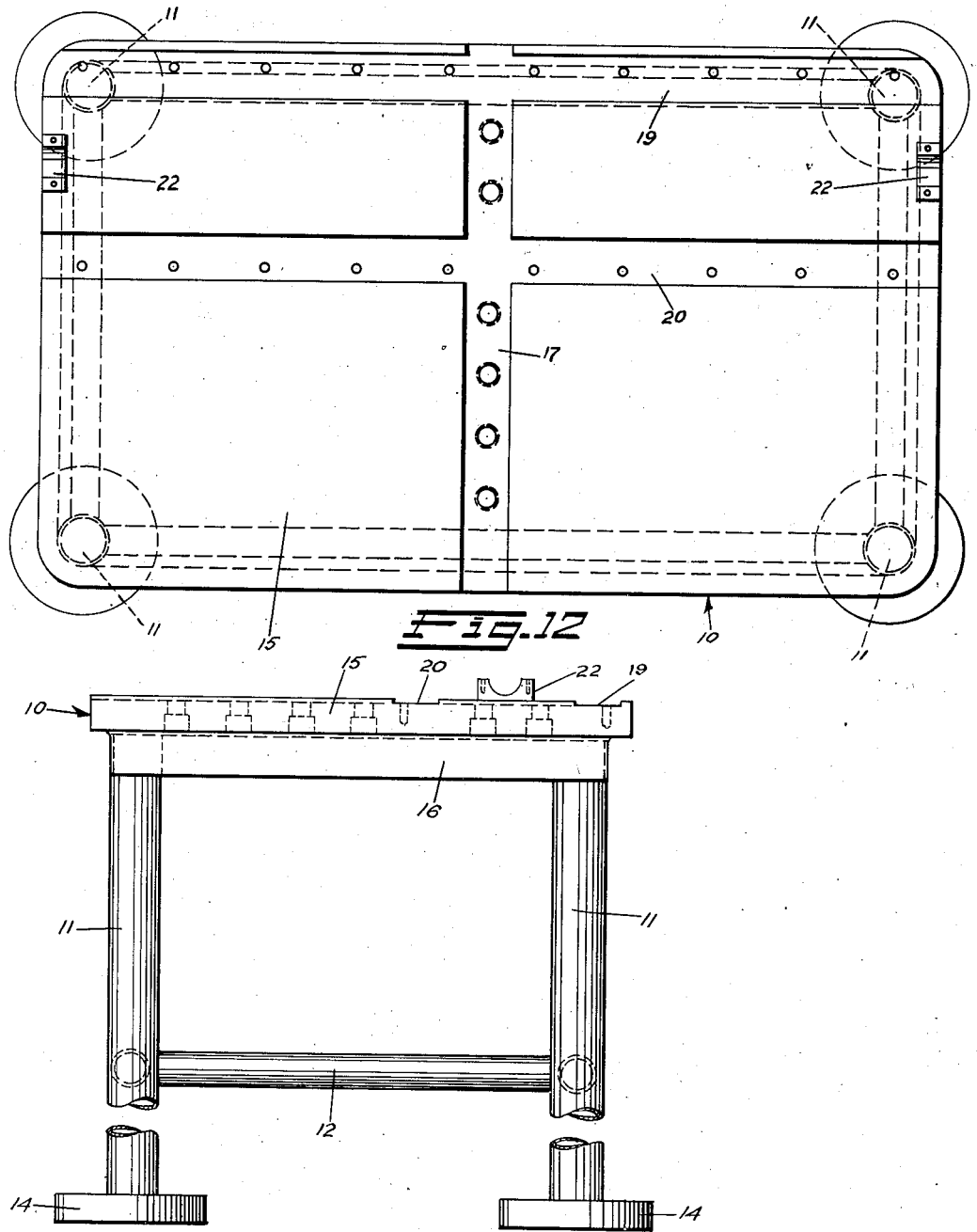

Patented Mar. 9, 1948

2,437,245

UNITED STATES PATENT OFFICE 2,437,245

ABRADING MACHINE

William De Young, Hawthorne, and Eric C. Weathered, Jersey City, N. J.

Application June 7, 1945, Serial No. 598,185

6 Claims. (Cl. 51—114)

(Granted under the act of March 3, 1883, as amended April 30, 1928; 370 O. G. 757)

This invention relates to an abrading machine in which the abrading wheels are angularly and linearly adjustable with respect to the work.

One object of this invention is to provide an abrading machine that has one or more abrading wheels positioned adjustably with respect to the work.

Another object is to provide an abrading machine in which the abrading wheels are positioned adjustably with respect to the work and in which the work support is positioned adjustably with respect to the table on which it is mounted.

Further objects and advantages of this invention, as well as its construction, arrangement and operation, will be apparent from the following description and claims in connection with the accompanying drawings, in which Fig. 1 is a top plan view of the assembled abrading machine, the motors being omitted for clarity;

Fig. 6 is a side view of the motor stand, showing parts related thereto partly in section;

Fig. 7 is a top plan view of the work support;

Fig. 8 is a front view of the work support;

Fig. 9 is a side view of the work support;

Fig. 12 is a top plan view of the table; and

Fig. 13 is an end view of the table.

Figure 1:
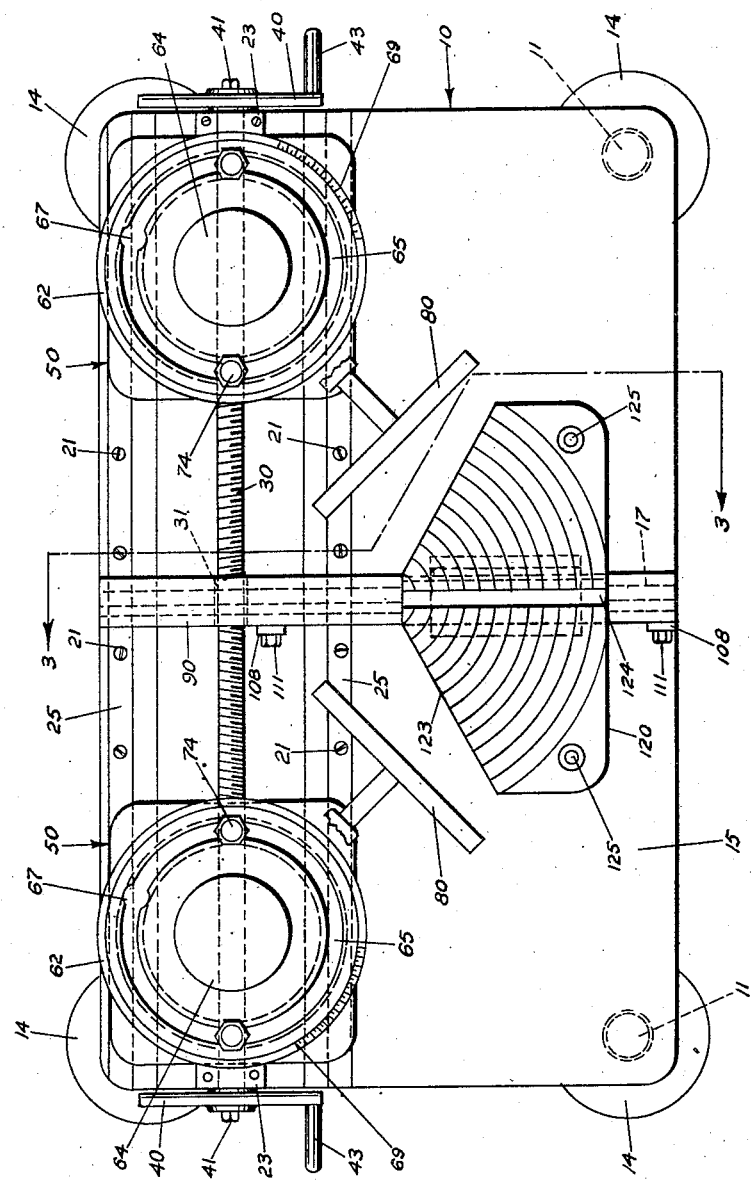
Figure 2:
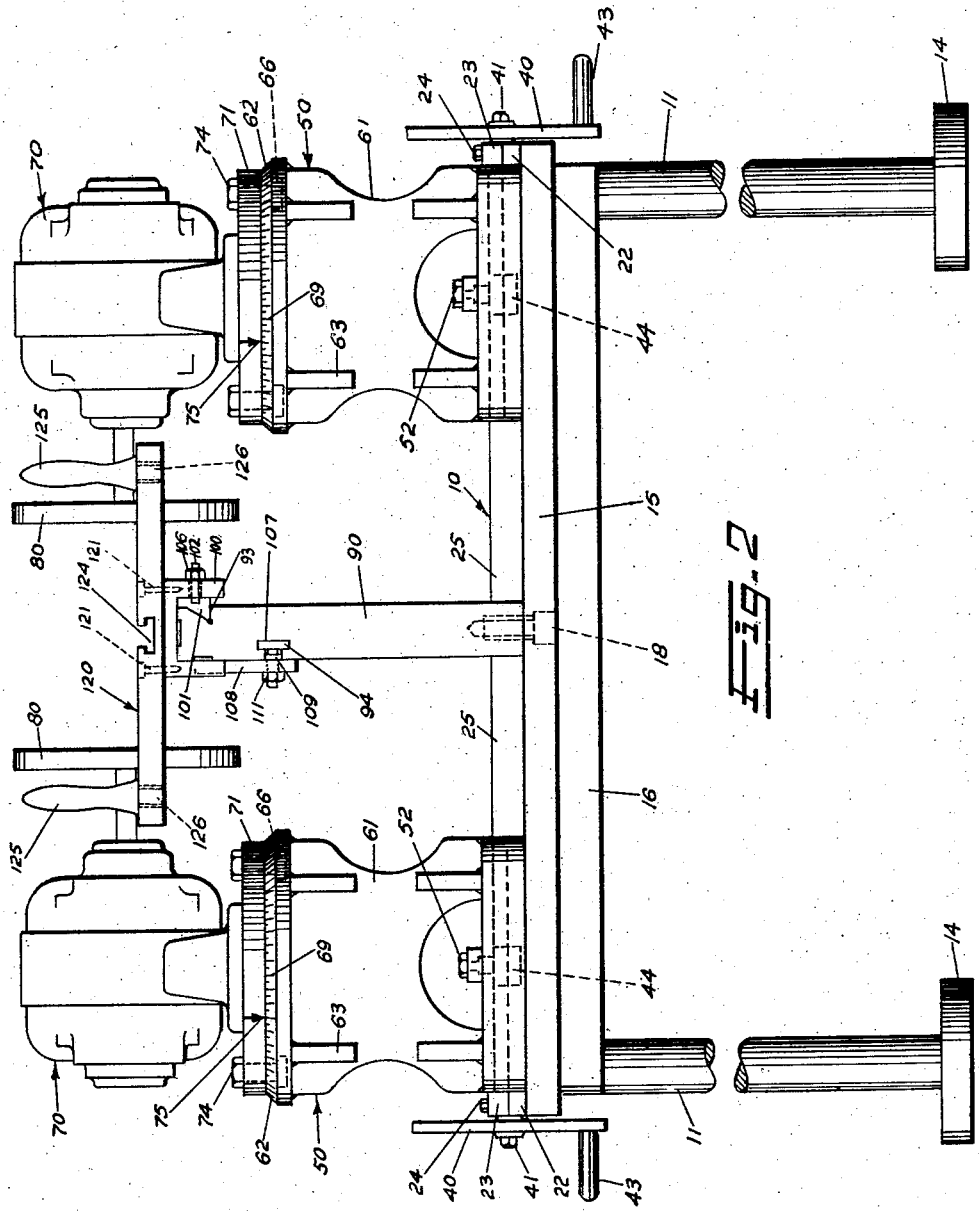
Fig. 2 is a front view of the assembled machine.
Figure 3:
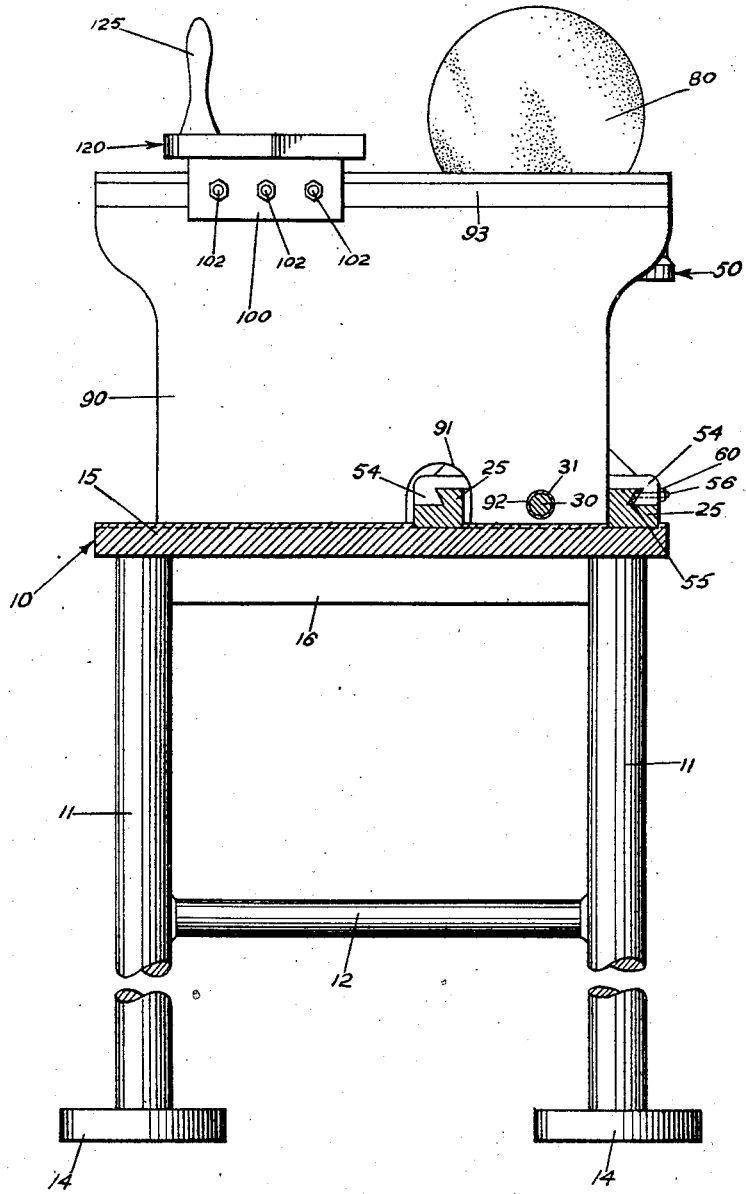
Fig. 3 is a vertical section taken on the line 3—3 of Fig. 1.
Figure 4:
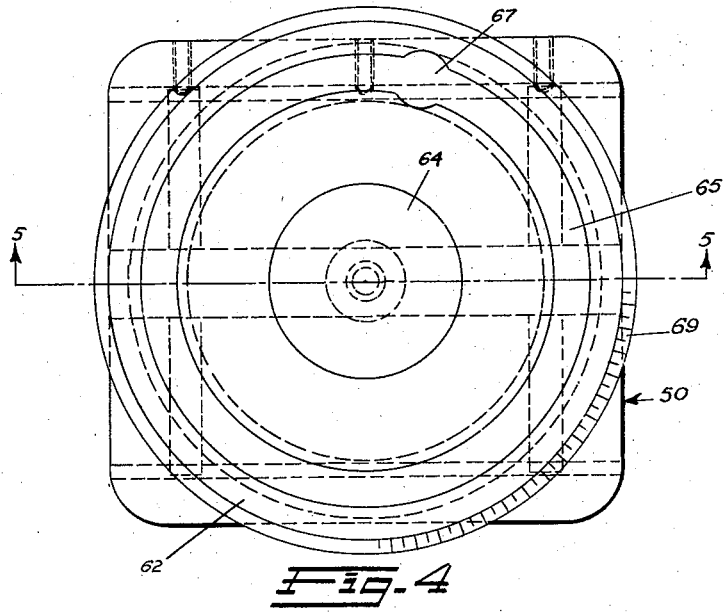
Fig. 4 is a top plan view of the motor stand.
Figure 5:
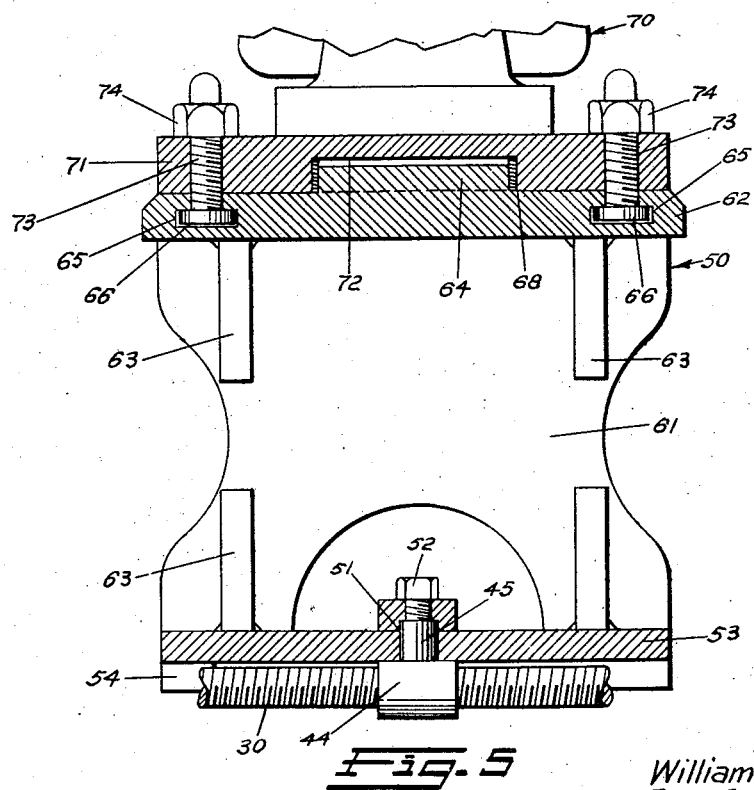
Fig. 5 is a vertical section on the line 5—5 of Fig. 4, showing parts related to the motor stand.

Similar numerals refer to similar parts throughout the several views. Figs. 1, 2, and 3 show the assembled abrading machine comprising portions designated generally as follows: a supporting table 10, motor stands 50 slidable on supporting table 10, motors 70 adjustable angularly on motor stands 50, abrading wheels 80, and work support 120.

The supporting table 10 consists of legs 11, joined together by transverse supporting members 12, welded or otherwise affixed to the legs 11. Shoes 14 are welded or otherwise affixed to legs 11. Table top 15 is affixed to and above legs 11 as by welding, or other means. Apron 16 depends from table top 15 and is welded or otherwise fixed to it. Depressed channel 17 is located in table top 15 for the reception of work-support rail 90. Work-support rail 90 is attached to table top 15 by means of cap screws 18. Depressed channels 19 and 20 are also located in table top 15 for the reception of slide rails 25. Slide rails 25 are attached to table top 15 by means of cap screws 21. Work-support rail 90 is recessed at 91 to permit passage of one of the slide rails 25.

On table top 15 are located the bottom portions 22 of brackets to support lead screws 30. The upper portions of these brackets are indicated by numerals 23 and are attached to bottom portions 22 by means of cap screws 24.

Lead screws 30 are mounted in and extend between bushings 34, which are located in brackets 22—23, and lead screw bushing 31, which is mounted in work-support rail 90. Collars 32 on lead screws 30 abut against brackets 22—23. Journal portions 33 of lead screws 30 are supported in bushings 34 in brackets 22—23, while end journal portions 35 are received in lead-screw bushing 31. It is to be noted that lead-screw bushing 31 is received by a drive fit in bore 92 of work-support rail 90.

Sections 36 of lead-screws 30 have keyways 37 for the reception of keys 38, which are also received in keyways 39 of knurled hand-wheels 40. Hand wheels 40 are held in assembled position by nuts 41 threaded on end portions 42 of lead-screws 30. Hand wheels 40 have handles 43 threaded therein for convenience of operation.

Threaded on lead-screws 30 are lead-screw nuts 44, having end portions 45 received in bores 51 of motor stands 50 and held therein by means of retaining bolts 52 passing through bores 51 in motor stands 50.

Motor stands 50 comprise foundation members 53 having slide members 54 complementary to rails 25.

Between the outer rail 25 and slides 54 of motor stands 50 are located gibs 55. Gibs 55 are connected to slide members 54 by means of gib screws 56. The depth of insertion of gib screws 56 is regulated by varying the position of nuts 60.

On foundation members 53 of motor stands 50 are uprights 61, which in turn support motor swivel-bases 62. Uprights 61 are connected to foundation members 53 and motor swivel-bases 62 by means of ribs 63, all connections being of welded construction. Motor swivel-bases 62 have bosses 64 and channels 65 of an inverted T-shape in cross section. Within channels 65 are located T-bolts 66, which are placed in channels 65 by insertion in hole 67.

Motors 70 having motor base-plates 71 are placed on motor swivel-bases 62, bushings 68 which encompass the bosses 64 being received in recesses 72 of motor base-plates 71. T-bolts 66 are received by bores 73 of motor base-plates 71 and fasten motors 70 to motor swivel-bases 62 by means of nuts 74.

Motor swivel-bases 62 are calibrated in degrees at 69, indicators 75 being inscribed on motor base-plates 71 to denote the angular position of the motors 70 and abrading wheels 80. Thus, the T-shaped channels 65 and T-bolts 66 provide a construction adapted to accommodate a wide variety of motors.

Work-support rail 90 has a groove of triangular cross-section at 93 and a channel of T-shaped cross-section at 94, both the groove 93 and channel 94 extending the length of work support rail 90. Overlying the top of rail 90 is a U-shaped slide-housing 100 attached adjustably to rail 90 by means of gib 101 and gib screws 102. Nuts 106 regulate the depth of penetration of gib screws 102.

Located in channel 94 are square-headed bolts 107, which hold two stops 108 in place adjustably. Stops 108 have square bosses 109 located in channel 94 and are bored for the reception of bolts 107. Nuts 111 are received on the threaded ends of bolts 107 to fix the position of the stops 108. It is to be noted that the position of stops 108, which abut housing 100, limit the range of movement of the housing 100 and the work support 120 fixed thereto.

Work support 120 is fixed to housing 100 by means of socket-head screws 121. Work support 120 has sloping sides 123, which meet at an angle of 120°. T-slot 124 is provided to receive clamping devices as required to hold the work in place.

While a work support having sides forming an angle of 120° is illustrated, it is to be understood that any shape table may be used to accommodate the work.

Figure 10:
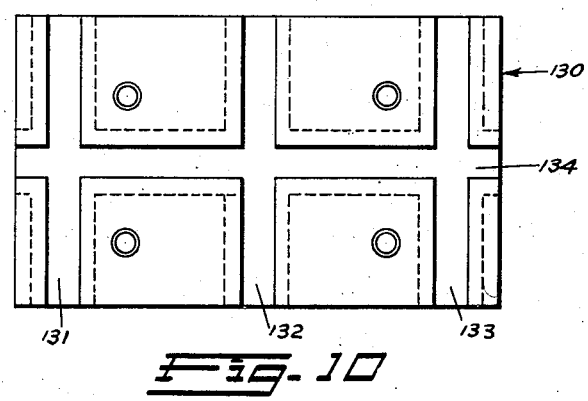
Fig. 10 is a top plan view of a modification of the work support.
Figure 11:
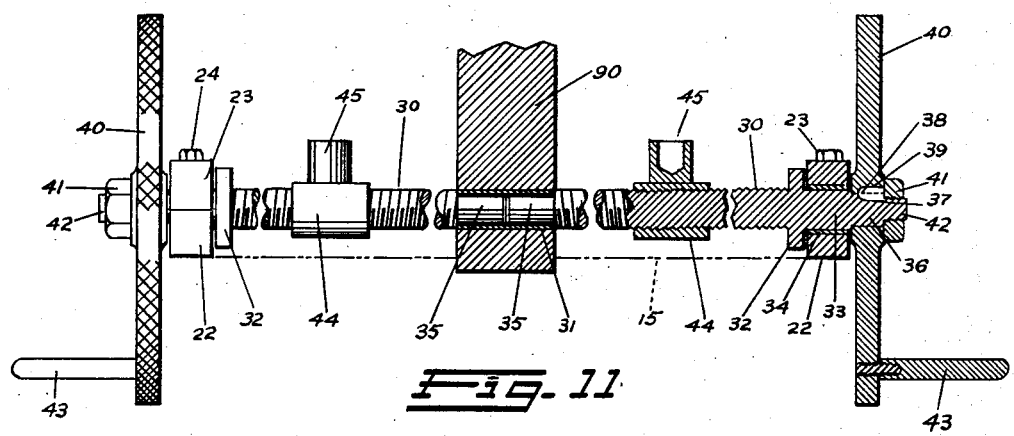
Fig. 11 is a front view of the lead screw and related parts, some elements being shown in section for clarity of illustration.

The modification shown in Fig. 10 comprises a rectangular table 130 with T-channels 131, 132, 133, and 134 for the reception of clamping devices.

Handles 125 for convenience of moving the work supports can be threaded into bores 126.

Various modifications and changes can be made in the above device without departing from the scope of the invention.

The invention described herein may be manufactured and used by or for the Government of the United States of America for governmental purposes without the payment of any royalties thereon or therefor.

We claim:

1. An abrading machine comprising a support, a vertically-extending rail on said support, an aperture in said rail, a bushing mounted in said rail between said rail aperture and one end of said rail, bearings on said support, lead screws mounted in said bearings and terminating in said bushing, parallel slide-rails on said support, one of said slide rails passing through said rail aperture, another of said slide rails being located adjacent said end of said rail, lead-screw nuts on said lead screws, motor stands, means to engage said motor stands for sliding movement on said slide-rails, means to attach said lead-screw nuts to said motor stands, means to rotate said lead screws whereby said motor stands are moved on said rails, circular channels in said motor stands, said channels being of an inverted T-shape in cross section, an enlarged aperture in each of said channels, bolts in said channels, the heads of said bolts being located in the lower portions of said channels, the shanks of said bolts extending through the vertical portions of said channels, motors having apertured base-plates on said motor stands, said bolt shanks extending through said motor base-plate apertures, fastening devices on said bolt shanks to secure said motor base-plates to said motor stands, a housing on said rail, means to vary the position of said housing, stops on said rail to limit the movement of said housing, a work support on said housing, and a channel in said work support for the reception of work-clamping devices.

2. An abrading machine comprising a support, motor stands on said support, motors on said motor stands, motor shafts on said motors, said motor shafts being in a common horizontal plane, a vertically extending, elongated rail between said motor stands, the upper portion of said rail on one side having a groove therein, a gib in said groove, an inverted U-shaped housing on the top of said rail, a screw in the side of housing for engagement with said gib, a T-shaped channel on the other side of said rail, bolts in said channel, elongated stops, said stops having projections for reception in said channel, said stops and projections threadedly receiving said bolts, and nuts on said bolts.

3. An abrading machine comprising a support, a first rail mounted on said support, an aperture in said rail, a bushing mounted in said rail, bearings on said support, lead screws mounted in said bearings and carried in said bushing, a slide rail on said support passing through said rail aperture, a plurality of motor stands, means to rotate said lead screws whereby said motor stands are moved on said slide rail, channels in said motor stands, motors carried on motor base-plates mounted on said motor stands, means to secure said motor base-plates in the channels of said motor stands, a housing on said first rail, means to vary the position of said housing, means to limit the movement of said housing, and a work support on said housing.

4. An abrading machine comprising a support, a first rail mounted on said support, an aperture in said rail, a bushing mounted in said rail, bearings on said support, lead screws mounted in said bearings and carried in said bushing, a plurality of slide rails on said support, at least one of said slide rails passing through said rail aperture, a plurality of motor stands, means to rotate said lead screws whereby said motor stands are moved on said slide rails, channels in said motor stands, motors carried on motor base-plates mounted on said motor stands, means to secure said motor base-plates in the channels of said motor stands, a housing on said first rail, means to vary the position of said housing, means to limit the movement of said housing, and a work support on said housing.

5. An abrading machine comprising a support, a first rail mounted on said support, an aperture in said rail, a bushing mounted in said rail, bearings on said support, lead screws mounted in said bearings and carried in said bushing, a plurality of slide rails on said support, at least one of said slide rails passing through said rail aperture, a plurality of motor stands, means to rotate said lead screws whereby said motor stands are moved on said slide rails, channels in said motor stands, motors carried on motor base-plates mounted on said motor stands, means to secure said motor base-plates in the channels of said motor stands, a housing on said first rail, means to vary the position of said housing, means to limit the movement of said housing, a work support on said housing, and means to secure a work-clamping device on said work support.

6. An abrading machine comprising a support, a first rail mounted on said support, an aperture in said rail, a bushing mounted in said rail, bearings on said support, lead screws mounted in said bearings and carried in said bushing, a plurality of side rails on said support, at least one of said slide rails passing through said rail aperture, a plurality of motor stands, means to rotate said lead screws whereby said motor stands are moved on said slide rails, channels in said motor stands, motors carried on motor base-plates mounted on said motor stands, means to secure said motor base-plates in the channels of said motor stands, a housing on said first rail, means to vary the position of said housing, means to limit the movement of said housing, a work support on said housing, and a channel in said work support for the reception of work-clamping devices.

WILLIAM DE YOUNG.
ERIC C. WEATHERED.

REFERENCES CITED

The following references are of record in the file of this patent:

UNITED STATES PATENTS

| Number | Name | Date |
| --- | --- | --- |
| 657,905 | Lea | Sept. 11, 1900 |
| 930,626 | Smith | Aug. 10, 1909 |
| 1,042,817 | Newman | Oct. 29, 1912 |
| 1,092,867 | Sellew | Apr. 14, 1914 |
| 1,107,997 | Perognat | Aug. 18, 1914 |
| 1,178,400 | Jones | Apr. 4, 1916 |
| 1,233,543 | Benicke | July 17, 1917 |
| 1,303,607 | Smith | May 13, 1919 |
| 1,420,323 | La Rock | June 20, 1922 |
| 1,614,076 | Mc Clenathen | Jan. 11, 1927 |
| 1,625,049 | Oliver | Apr. 19, 1927 |
| 1,628,878 | Gardner | May 17, 1927 |
| 1,649,823 | Gardner | Nov. 22, 1927 |
| 1,692,833 | Heim | Nov. 27, 1928 |
| 1,778,132 | Wegner | Oct. 14, 1930 |
| 1,862,379 | Koestlin | June 7, 1932 |
| 1,906,731 | Wuerfel | May 2, 1933 |
| 1,958,734 | Woodsmall | May 15, 1934 |
| 2,398,463 | Rumsey | Apr. 16, 1946 |

FOREIGN PATENTS

| Number | Country | Date |
| --- | --- | --- |
| 1,812 | Great Britain | 1866 |